United States Patent Office 3,244,198
Patented Apr. 5, 1966

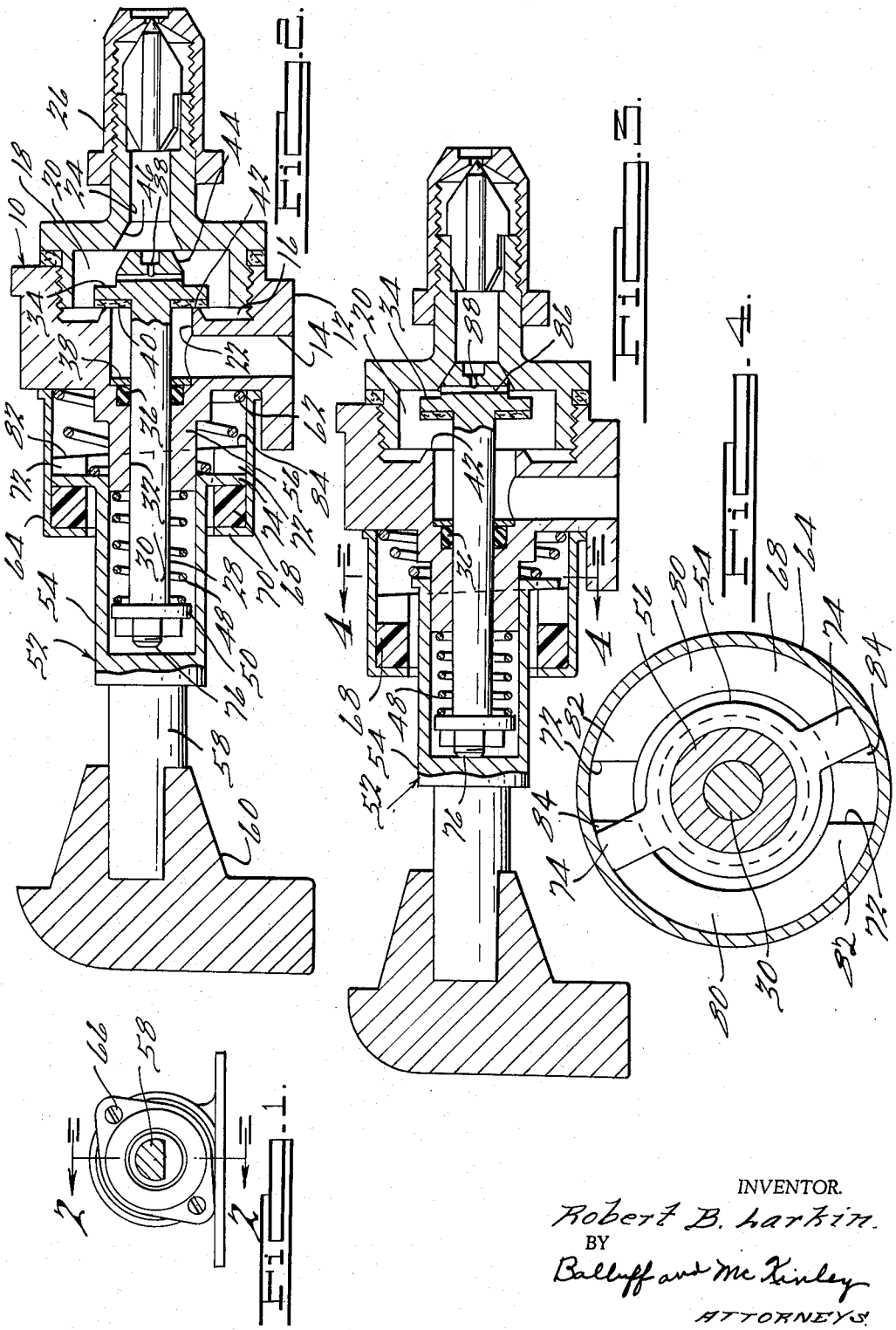

3,244,198
BURNER VALVE
Robert B. Larkin, Farmington, Mich., assignor to Mills Products, Inc., Walled Lake, Mich., a corporation of Michigan
Filed June 10, 1963, Ser. No. 286,541
10 Claims. (Cl. 137—625.3)

This invention relates to valves and has particular reference to a valve for controlling the supply of gas to the top burner of a gas range. Gas burners currently in use are designed to operate at a maximum output of about 12,000 B.t.u.'s per hour and are also designed for a minimum flow rate of about 500 B.t.u.'s per hour. Valves heretofore used for controlling the gas flow to burners of this type have been found to be quite inefficient in supplying the minimum flow rates for simmering heats. Such valves often become clogged from grease used in lubricating the valve with the result that the minimum flow rate attainable varies considerably and frequently no gas flow is possible when the valve is turned to its low position.

The present invention provides a valve which is designed to overcome the objections heretofore experienced in gas burner valves intended for use with the single duty burner which is designed to be turned down to a minimum flow rate for simmering heats. The valve of the present invention does not require grease for lubrication or for sealing purposes and it can be accurately controlled to provide the required flow rate.

A principal object of the invention is to provide a new and improved valve for controlling the supply of gas to a gas burner. Another object of the invention is to provide a valve of the type described which is capable of providing a uniform minimum flow rate.

Other and further objects of the invention will be apparent from the following description and claims and may be understood by reference to the accompanying drawing, of which there is one sheet, which by way of illustration shows a preferred embodiment of the invention and what I now consider to be the best mode of applying the principles thereof. Other embodiments of the invention may be used without departing from the scope of the present invention as set forth in the appended claims.

In the drawings:

FIG. 1 is an end elevational view of the valve.
FIG. 2 is a sectional view taken on line 2—2 of FIG. 1.
FIG. 3 is a view similar to FIG. 2 showing the valve turned down to its minimum flow position; and
FIG. 4 is a sectional view taken on line 4—4 of FIG. 3.

The valve comprises a valve body 10 having a mounting flange 12 provided with an inlet passage 14 through which gas is supplied to the interior of the valve body. The valve body is provided with a recess 16 at one end thereof which is interiorly threaded to receive a cover member 18. The cover member 18 and the valve body 10 define a valve chamber 20 provided with an inlet passage 22 which communicates with the gas supply passage and an outlet passage 24 which extends axially through the member 18. A nozzle 26 is threaded onto the outer end of the member 18 and is adapted to be connected to the burner head in a conventional manner.

A valve member 28 is provided with a valve stem 30 which is slidable within a bore 32 in the valve body 10 and is also provided with a valve head 34 which is disposed within the valve chamber 20. A seal 36 is disposed between the valve stem 30 and the valve body 10 and is retained in position by a washer 38. Valve head 34 is provided with a disc shaped seal 40 which is adapted to sealingly engage a valve seat 42 which surrounds the opening of the gas supply passage 22 into the valve chamber 20. The outer end 44 of the valve head 34 is tapered and is adapted to sealingly engage a conical valve seat 46 which surrounds the opening of the outlet passage 24 into the valve chamber 20. A spring 48 is confined between the valve body 10 and a washer 50 secured on the outer end of the valve stem 30 and urges the valve into sealing engagement with the valve seat 42.

A handle member 52 is slidably and rotatably mounted on the valve body 10. The handle member 52 is provided with a hollow cylindrical body portion 54 which is slidably and rotatably mounted on a cylindrical boss 56 formed on the valve body 10 and a stem 58 having an operating handle 60 secured thereto. A spring 62 is confined between the valve body 10 and the inner end of the portion 54 of the handle member to urge the handle member outwardly to the position shown in FIG. 2.

A cap 64 is secured on the valve body 10 by screws 66 and surrounds the inner end of the handle member 54. A cam member 68 is secured against the end wall 70 of the cap 64 and is provided with diametrically opposed recesses 72 adapted to receive radially extended lugs 74 on the inner end of the handle member 52.

The spring 62 normally holds the lugs 74 in the recesses 72 to prevent rotation of the handle. When the valve is to be turned on, the handle is axially depressed to disengage the lugs 74 from the recesses 72 and at the same time to engage the outer end 76 of the valve stem 30 to shift the valve head 34 away from the valve seat 42 to open the valve to its fully opened position. The cam member 68 is provided with cam surfaces 80 adapted to be engaged by the lugs 74 on the handle member 52 when the handle is rotated after being depressed to release the lugs 74 from the recesses 72. Each of the cam surfaces 80 is provided with a low point 82 immediately adjacent of one of the recesses 72 so that the handle member may be turned in a counterclockwise direction as soon as the lugs 74 are disengaged from the recesses 72. The cam surfaces 80 are provided with high points 84 at their other ends so that continued rotation of the handle member causes the handle member and the valve member 28 which is engaged thereby to shift inwardly to progressively close the tapered end 44 of the valve head 34 against its valve seat 46. The flow rate through the valve is thus controlled by the rotational position of the handle member 52.

When the handle member 52 is turned down to its low position, the valve head will be seated against the valve seat 46 as shown in FIG. 3. The valve head is provided with a cross-drilling 86 and an axial metering passage 88 which intersects the passage 86. The passages 86 and 88 provide a bypass through which gas is supplied to the nozzle 26 when the valve is turned down to its minimum flow position. The size of the passages 86 and 88 may be selected to provide the desired flow rate through the valve. When the handle member is subsequently turned in a clockwise direction, the cam surfaces 80 will permit the handle member to shift outwardly under the force of spring 62 and similarly the valve member 28 will be shifted by the spring 48 to open the passage 24. When the handle member is returned to its closed position, the spring 62 will force the lugs 74 into the recesses 72 to prevent rotation of the handle member and to permit the valve member 28 to be returned to its normally closed position in engagement with the valve seat 42.

The valve constructed described herein provides a positive and effective cut off of the gas supply when the handle is turned to the closed position. The seal 40 may be made of a suitable elastomeric material which does not require lubrication. The valve also provides a smooth and gradual reduction of the gas flow from the full on position down to the minimum flow position and the bypass passage through the valve head provides a fixed and accurately controlled minimum flow rate.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A burner valve for a gas range comprising a valve body having a valve chamber and gas supply and outlet passages communicating with said chamber, a valve member slidable in said valve body and having a valve head disposed in said valve chamber and adapted to close said supply passage, a handle member slidably and rotatably mounted on said valve body and engageable with said valve member, means for locking said handle member against rotation, said handle member being depressible to disengage said locking means to permit rotation of said handle and to shift said valve head to open said supply passage and provide for the flow of gas past said valve head to said outlet passage, means on said valve body cooperable with said handle member upon rotation thereof in one direction to shift said handle member inwardly and thereby shift said valve head to progressively close said outlet passage, and a restricted passage in said valve head communicating said valve chamber with said outlet passage to provide a minimum flow passage through said valve when said valve head closes said outlet passage.

2. A burner valve for a gas range comprising a valve body having a valve chamber and gas supply and outlet passages communicating with said chamber, a valve member slidably mounted in said valve body normally closing said supply passage and adapted for movement in one direction to open said supply passage and close said outlet passage, a handle member slidably and rotatably mounted on said valve body and engageable with said valve member, means for locking said handle member against rotation, said handle member being depressible to disengage said locking means to permit rotation of said handle and to shift said valve member in said one direction to open said supply passage and provide for the flow of gas to said outlet passage, means on said valve body cooperable with said handle member upon rotation thereof in one direction to shift said handle axially thereby to shift said valve member in said one direction to progressively close said outlet passage, and a passage in said valve member communicating said valve chamber with said outlet passage to provide a minimum flow passage through said valve when said valve member closes said outlet passage.

3. A burner valve for a gas range comprising a valve body having gas supply and outlet passages therein, a valve member slidably mounted in said valve body and normally closing said supply passage, a handle member slidably and rotatably mounted on said valve body and engageable with said valve member, means for locking said handle member against rotation, said handle member being depressible to disengage said locking means to permit rotation of said handle and to shift said valve member to open said supply passage, means on said valve body cooperable with said handle member upon rotation thereof in one direction to shift said handle member axially thereby to shift said valve member to progressively close said outlet passage, a restricted passage in said valve member providing a minimum flow passage between said supply and outlet passages when said valve member closes said outlet passage and spring means operable to shift said valve member and said handle member axially to progressively open said outlet passage and then close said supply passage upon rotation of said handle member in the opposite direction.

4. A burner valve for a gas range comprising a valve body having a valve chamber and axially aligned gas supply and outlet passages communicating with said chamber, a valve seat surrounding the opening of each of said passages into said chamber, a valve member having a valve stem slidable in said valve body and a valve head disposed in said valve chamber, spring means urging said valve head into sealing engagement with the valve seat surrounding said gas supply passage to close said valve, a handle member slidably and rotatably mounted on said valve body and engageable with the outer end of said valve stem, means for locking said handle member against rotation, said handle member being depressible to disengage said locking means to permit rotation of said handle and to shift said valve head away from said valve seat around said supply passage to open said valve, means on said valve body cooperable with said handle member upon rotation thereof in one direction to shift said handle member inwardly and thereby shift said valve head toward the other valve seat to progressively close said outlet passage, and a restricted passage in said valve head communicating said valve chamber with said outlet passage when said valve head closes said outlet passage.

5. A burner valve for a gas range comprising a valve body having a valve chamber and axially aligned gas supply and outlet passages communicating with said chamber, a valve seat surrounding the opening of each of said passages into said chamber, a valve member having a valve stem slidable in said valve body and a valve head disposed in said chamber, spring means urging said valve head into sealing engagement with the valve seat surrounding said gas supply passage to close said valve, a handle member slidably and rotatably mounted on said valve body and engageable with the outer end of said valve stem, a cap mounted on said valve body and surrounding the inner end of said handle member, a cam member in said cap having diametrically opposed axially extending recesses therein and an inwardly facing circular cam surface thereon, said handle member having a pair of lugs engageable in said recesses to prevent rotation of said handle member, a spring urging said handle member outwardly to engage lugs in said recesses, said handle member being movable axially against said spring to disengage said lugs from said recesses and shift said valve head out of engagement with the valve seat around said supply passage to open said valve, said handle member being rotatable in one direction when said lugs are disengaged from said recesses to engage said lugs with said cam surface thereby to shift said valve head toward the other valve seat to progressively close said outlet passage, and a restricted passage in said valve head communicating said valve chamber with said outlet passage when said valve head engages said other valve seat to close said outlet passage.

6. A burner valve for a gas range comprising a valve body having gas supply and outlet passages therein, a valve member slidably mounted in said valve body and normally closing said supply passage, a handle member slidably and rotatably mounted on said valve body and engageable with said valve member, a cap mounted on said valve body and surrounding the inner end of said handle member, a cam member in said cap having an axially extending recess therein and an inwardly facing circular cam surface thereon, said handle member having a lug engageable in said recess to prevent rotation of said handle member, said handle member being depressible to disengage said lug from said recess to permit rotation of said handle member and to shift said valve member to open said supply passage, said lug being engageable with said cam surface upon rotation of said handle member in one direction thereby to shift said valve member to progressively close said outlet passage, a restricted passage in said valve member providing a minimum flow passage between said gas supply and outlet passages when said valve member closes said outlet passage, and spring means operable to shift said handle member and said valve member to progressively open said outlet passage and then close said supply passage upon rotation of said handle member in the opposite direction.

7. A burner valve for a gas range comprising a valve body having a valve chamber and axially aligned gas supply and outlet passages communicating with said chamber, a valve seat surrounding the opening of each of said passages into said chamber, a valve member slidably mounted in said valve body and having oppositely facing sealing surfaces thereon each engageable with one of said valve seats, spring means urging said valve member into sealing engagement with the valve seat surrounding said gas supply passage to close said valve, a handle member slidably and rotatably mounted on said valve body and engageable with said valve member, means for locking said handle member against rotation, said handle member being depressible to disengage said locking means to permit rotation of said handle and to shift said valve member toward the other valve seat to open said valve, means on said valve body cooperable with said handle member upon rotation thereof in one direction to shift said handle member inwardly and thereby shift said valve member toward said other valve seat to progressively close said valve, and a restricted passage in said valve member communicating said valve chamber with said outlet passage when said valve member engages said other valve seat.

8. A valve according to claim 7 including spring means operable to shift said valve member to progressively shift toward the valve seat surrounding said supply passage upon rotation of said handle member in the opposite direction.

9. A burner valve for a gas range comprising a valve body having a valve chamber and gas supply and outlet passages communicating with said chamber, a valve member slidable in said valve body and normally closing said supply passage, a handle member slidably and rotatably mounted on said valve body and engageable with said valve member, means for locking said handle member against rotation, said handle member being depressible to disengage said locking means to permit rotation of said handle and to shift said valve member to open said supply passage and provide for the flow of gas to said outlet passage, cam means on said valve body cooperable with said handle member upon rotation thereof in one direction to shift said handle member inwardly and thereby shift said valve member to progressively close said outlet passage, and restricted passage means communicating said valve chamber with said outlet passage to provide a minimum flow passage through said valve when said valve member closes said outlet passage.

10. A valve according to claim 9 including spring means for returning said valve member to its said normally closed position upon rotation of said handle member in the opposite direction.

No references cited.

ISADOR WEIL, *Primary Examiner.*

A. COHAN, *Assistant Examiner.*